(12) United States Patent
Kolar et al.

(10) Patent No.: US 11,706,130 B2
(45) Date of Patent: Jul. 18, 2023

(54) ROOT-CAUSING USER EXPERIENCE ANOMALIES TO COORDINATE REACTIVE POLICIES IN APPLICATION-AWARE ROUTING

(71) Applicant: Cisco Technology, Inc., San Jose, CA (US)

(72) Inventors: Vinay Kumar Kolar, San Jose, CA (US); Jean-Philippe Vasseur, Saint Martin d'Uriage (FR); Grégory Mermoud, Venthône (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/379,252

(22) Filed: Jul. 19, 2021

(65) Prior Publication Data

US 2023/0027754 A1 Jan. 26, 2023

(51) Int. Cl.
| | | |
|---|---|---|
| *H04L 45/28* | (2022.01) | |
| *H04L 45/24* | (2022.01) | |
| *H04L 41/0631* | (2022.01) | |
| *H04L 45/302* | (2022.01) | |
| *H04L 45/02* | (2022.01) | |

(52) U.S. Cl.
CPC .......... *H04L 45/28* (2013.01); *H04L 41/0631* (2013.01); *H04L 45/02* (2013.01); *H04L 45/24* (2013.01); *H04L 45/302* (2013.01)

(58) Field of Classification Search
CPC ..... H04L 45/28; H04L 41/0631; H04L 45/02; H04L 45/24; H04L 45/302

USPC .......................................................... 709/238
See application file for complete search history.

(56) References Cited

U.S. PATENT DOCUMENTS

| | | | |
|---|---|---|---|
| 10,102,054 B2 | 10/2018 | Wolf et al. | |
| 10,623,285 B1* | 4/2020 | Shevade | H04L 43/08 |
| 10,728,117 B1* | 7/2020 | Sharma | H04L 41/5067 |
| 11,044,533 B1* | 6/2021 | Li | H04L 41/064 |
| 11,086,709 B1* | 8/2021 | Ratkovic | G06F 11/0709 |
| 11,126,492 B1* | 9/2021 | Graklanoff | G06F 11/3452 |
| 11,138,163 B2* | 10/2021 | Mdini | G06F 16/212 |

(Continued)

OTHER PUBLICATIONS

Soon Tee Teoh,et al. 2006. BGP eye: a new visualization tool for real-time detection and analysis of BGP anomalies. In Proceedings of the 3rd international workshop on Visualization for computer security (VizSEC '06). Association for Computing Machinery, 81-90. (Year: 2006).*

(Continued)

*Primary Examiner* — Melvin H Pollack
(74) *Attorney, Agent, or Firm* — Behmke Innovation Group LLC; Kenneth J. Heywood; Jonathon P. Western

(57) ABSTRACT

In one embodiment, a device obtains user experience metrics for a plurality of sessions with an online application. The device detects a plurality of anomalies from among the user experience metrics. The device determines, based on a correlation between the plurality of anomalies, that a particular path entity is a root cause of the plurality of anomalies. The particular path entity comprises an egress service provider or data center of the online application. The device provides an indication of the particular path entity being the root cause of the plurality of anomalies.

18 Claims, 15 Drawing Sheets

(56) References Cited

U.S. PATENT DOCUMENTS

| | | | | |
|---|---|---|---|---|
| 11,151,125 B1* | 10/2021 | Dwivedi | ............... | G06F 16/248 |
| 11,201,779 B1* | 12/2021 | Avazpour | ............ | H04L 41/0681 |
| 11,269,718 B1* | 3/2022 | Chen | ..................... | G06F 11/079 |
| 11,271,797 B2* | 3/2022 | Yadav | ................ | H04L 41/0636 |
| 11,277,437 B1* | 3/2022 | Burgis | ............... | G06Q 20/4016 |
| 11,323,312 B1* | 5/2022 | Banka | ................... | H04W 28/24 |
| 11,336,506 B1* | 5/2022 | Li | ....................... | H04L 41/0631 |
| 11,343,171 B2* | 5/2022 | Vasseur | ................ | H04L 47/825 |
| 11,366,466 B1* | 6/2022 | Qadri | .................. | G06F 11/3006 |
| 11,368,588 B1* | 6/2022 | Johnston | ............ | H04M 3/5238 |
| 11,397,634 B1* | 7/2022 | Monga | ................ | G06F 11/0754 |
| 11,398,990 B1* | 7/2022 | Cabrera | ............... | G06K 9/6269 |
| 11,483,218 B2* | 10/2022 | Al-Dulaimi | ......... | H04L 41/5054 |
| 2016/0179598 A1* | 6/2016 | Lvin | ....................... | H04L 41/22 |
| | | | | 714/48 |
| 2018/0091394 A1* | 3/2018 | Richards | ............. | H04L 12/4641 |
| 2018/0091413 A1* | 3/2018 | Richards | ................ | H04L 43/14 |
| 2019/0034254 A1 | 1/2019 | Nataraj et al. | | |
| 2019/0190945 A1* | 6/2019 | Jang | .................. | H04L 63/1425 |
| 2019/0222491 A1* | 7/2019 | Tomkins | ............. | H04L 41/0823 |
| 2019/0339688 A1* | 11/2019 | Celia | .................. | G05B 23/0229 |
| 2020/0004607 A1* | 1/2020 | Mahajani | ................ | H04L 43/04 |
| 2020/0128441 A1* | 4/2020 | Singh | ..................... | H04W 24/04 |
| 2020/0177458 A1* | 6/2020 | Rahman | ................ | H04L 41/065 |
| 2020/0274783 A1* | 8/2020 | Sharma | .................. | H04L 43/045 |
| 2020/0328978 A1 | 10/2020 | Gupta et al. | | |
| 2021/0026724 A1 | 1/2021 | Nadger et al. | | |
| 2021/0056487 A1* | 2/2021 | Boyle | ................ | H04L 43/08 |
| 2021/0141900 A1* | 5/2021 | Brown | .................. | G06F 21/566 |
| 2021/0216559 A1* | 7/2021 | Aghajanyan | ........ | G06F 3/04847 |
| 2021/0303381 A1* | 9/2021 | Baldassarre | ........ | G06F 11/0751 |
| 2021/0377131 A1* | 12/2021 | Zilberman | ............. | H04L 45/22 |
| 2021/0377623 A1* | 12/2021 | Larson | ............ | H04N 21/64738 |
| 2021/0382770 A1* | 12/2021 | Lu | ....................... | G06V 30/1988 |
| 2022/0019497 A1* | 1/2022 | Li | ....................... | G06F 11/0772 |
| 2022/0019588 A1* | 1/2022 | Jha | ....................... | G06F 16/1734 |
| 2022/0027249 A1* | 1/2022 | Dua | ....................... | G06F 11/076 |
| 2022/0027257 A1* | 1/2022 | Harutyunyan | ....... | G06F 11/3419 |
| 2022/0029906 A1* | 1/2022 | Mahesh | ................ | H04L 41/046 |
| 2022/0043703 A1* | 2/2022 | Hwang | .................. | G06F 40/40 |
| 2022/0052905 A1* | 2/2022 | Vasseur | ................ | H04L 41/14 |
| 2022/0070050 A1* | 3/2022 | D'Ippolito | .......... | H04L 41/0609 |
| 2022/0070201 A1* | 3/2022 | Almaz | ................ | H04L 63/1425 |
| 2022/0100780 A1* | 3/2022 | Jha | ..................... | G06F 11/0787 |
| 2022/0103417 A1* | 3/2022 | Grammel | .............. | H04L 41/145 |
| 2022/0156154 A1* | 5/2022 | Varnavas | ............ | G06F 11/3409 |
| 2022/0166663 A1* | 5/2022 | Banka | ................ | H04W 28/0268 |
| 2022/0191247 A1* | 6/2022 | Dhoble | .................... | G06F 21/79 |
| 2022/0200989 A1* | 6/2022 | Andrews | ............... | H04L 63/166 |
| 2022/0255810 A1* | 8/2022 | Tomkins | ............... | H04L 41/065 |
| 2022/0329995 A1* | 10/2022 | Venkata | .................. | H04W 4/50 |
| 2022/0335008 A1* | 10/2022 | Ajmera | .................. | H04L 43/062 |
| 2022/0337471 A1* | 10/2022 | Patel | ....................... | H04L 43/16 |

OTHER PUBLICATIONS

T. M. Ahmed, C. Bezemer, T. Chen, A. E. Hassan and W. Shang, "Studying the Effectiveness of Application Performance Management (APM) Tools for Detecting Performance Regressions for Web Applications: An Experience Report," 2016 IEEE/ACM 13th Working Conference on Mining Software Repositories, 1-12. (Year: 2016).*

M. H. Bhuyan, D. K. Bhattacharyya and J. K. Kalita, "Network Anomaly Detection: Methods, Systems and Tools," in IEEE Communications Surveys & Tutorials, vol. 16, No. 1, pp. 303-336, First Quarter 2014, doi: 10.1109/SURV.2013.052213.00046. (Year: 2014).*

Min Du, Feifei Li, Guineng Zheng, and Vivek Srikumar. 2017. DeepLog: Anomaly Detection and Diagnosis from System Logs through Deep Learning. In Proceedings of the 2017 ACM SIGSAC Conference on Computer and Communications Security (CCS '17). Association for Computing Machinery, New York, 1285-1298. (Year: 2017).*

Olumuyiwa Ibidunmoye, Francisco Hernández-Rodriguez, and Erik Elmroth. 2015. Performance Anomaly Detection and Bottleneck Identification. <i>ACM Comput. Surv.</i> 48, 1, Article 4 (Sep. 2015), 35 pages, https://doi.org/10.1145/2791120 (Year: 2015 ).*

Srikanth Kandula, Sudipta Sengupta, Albert Greenberg, Parveen Patel, and Ronnie Chaiken. 2009. The nature of data center traffic : measurements analysis. In Proceedings of the 9th ACM SIGCOMM conference on Internet measurement (IMC '09). Association for Computing Machinery, New York, 202-208. (Year: 2009).*

S. Garg, K. Kaur, N. Kumar, G. Kaddoum, A. Y. Zomaya and R. Ranjan, "A Hybrid Deep Learning-Based Model for Anomaly Detection in Cloud Datacenter Networks," in IEEE Transactions on Network and Service Management, vol. 16, No. 3, pp. 924-935, Sep. 2019, doi: 10.1109/TNSM.2019.2927886. (Year: 2019).*

\* cited by examiner

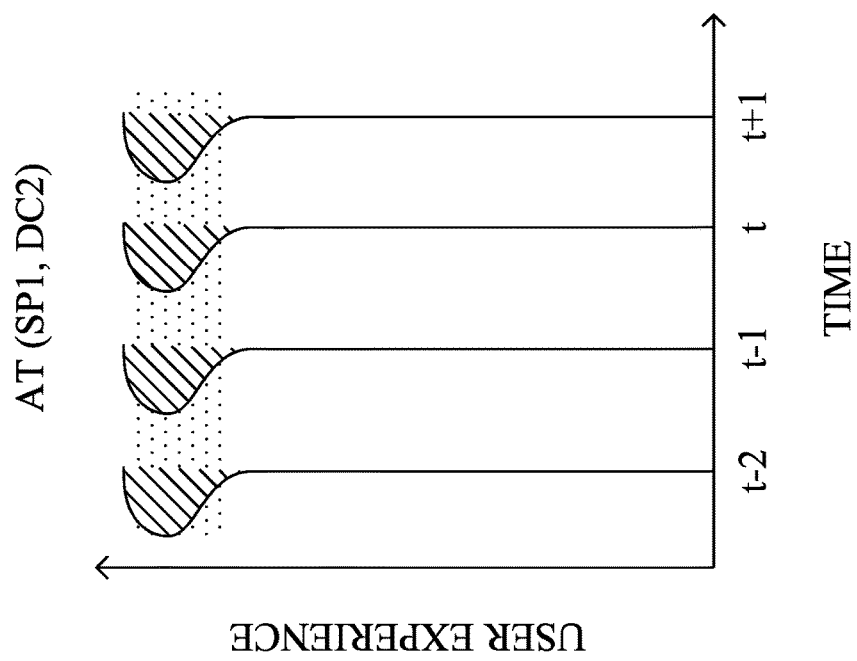

ROOT-CAUSING USER EXPERIENCE ANOMALIES TO COORDINATE REACTIVE POLICIES IN APPLICATION-AWARE ROUTING

TECHNICAL FIELD

The present disclosure relates generally to computer networks, and, more particularly, to root-causing user experience anomalies to coordinate reactive policies in application-aware routing.

BACKGROUND

Software-as-a-Service (SaaS) applications are usually deployed across the globe in different data centers. Users from different regions connect via core Internet links to these SaaS applications. Hence, the application experience of a user of a SaaS application depends on a number of different points of failure: the endpoint device of the user, their Local Area Network (LAN), the core Internet, the SaaS endpoint(s)/data center(s), etc. Accordingly, troubleshooting poor SaaS application experience to trigger corrective measures (e.g., rerouting the application traffic) with such a wide array of possible components interacting with each other is challenging.

Traditional application-aware routing used in software-defined wide area network (SD-WANs) and other network deployments typically rely on probing of the network paths, to detect and mitigate against poor application experience by comparing the probing results to service level agreements (SLAs). For instance, latency that exceeds a. defined SLA threshold is presumed to impact the user experience with the application and may trigger a traffic reroute. Testing has shown, however, that SLA violations are not necessarily indicative of the true application experience for users of certain applications, particularly for those applications that are resilient to such violations.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7D illustrate example plots of user experience metrics over time;

DESCRIPTION OF EXAMPLE EMBODIMENTS

Overview

Figure 1A:
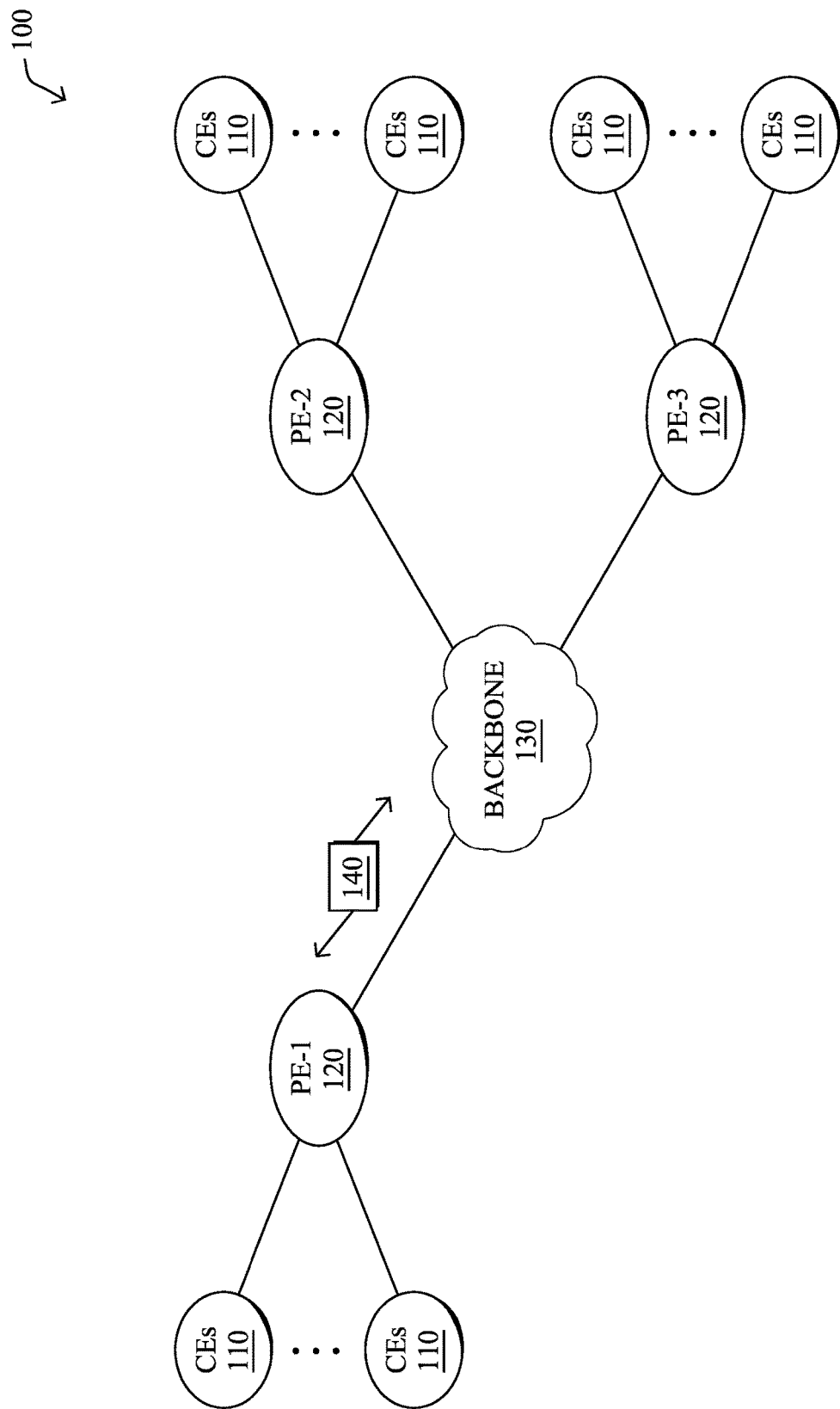
FIGS. 1A-1B illustrate an example communication network.

According to one or more embodiments of the disclosure, a device obtains user experience metrics for a plurality of sessions with an online application. The device detects a plurality of anomalies from among the user experience metrics. The device determines, based on a correlation between the plurality of anomalies, that a particular path entity is a root cause of the plurality of anomalies. The particular path entity comprises an egress service provider or data center of the online application. The device provides an indication of the particular path entity being the root cause of the plurality of anomalies.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
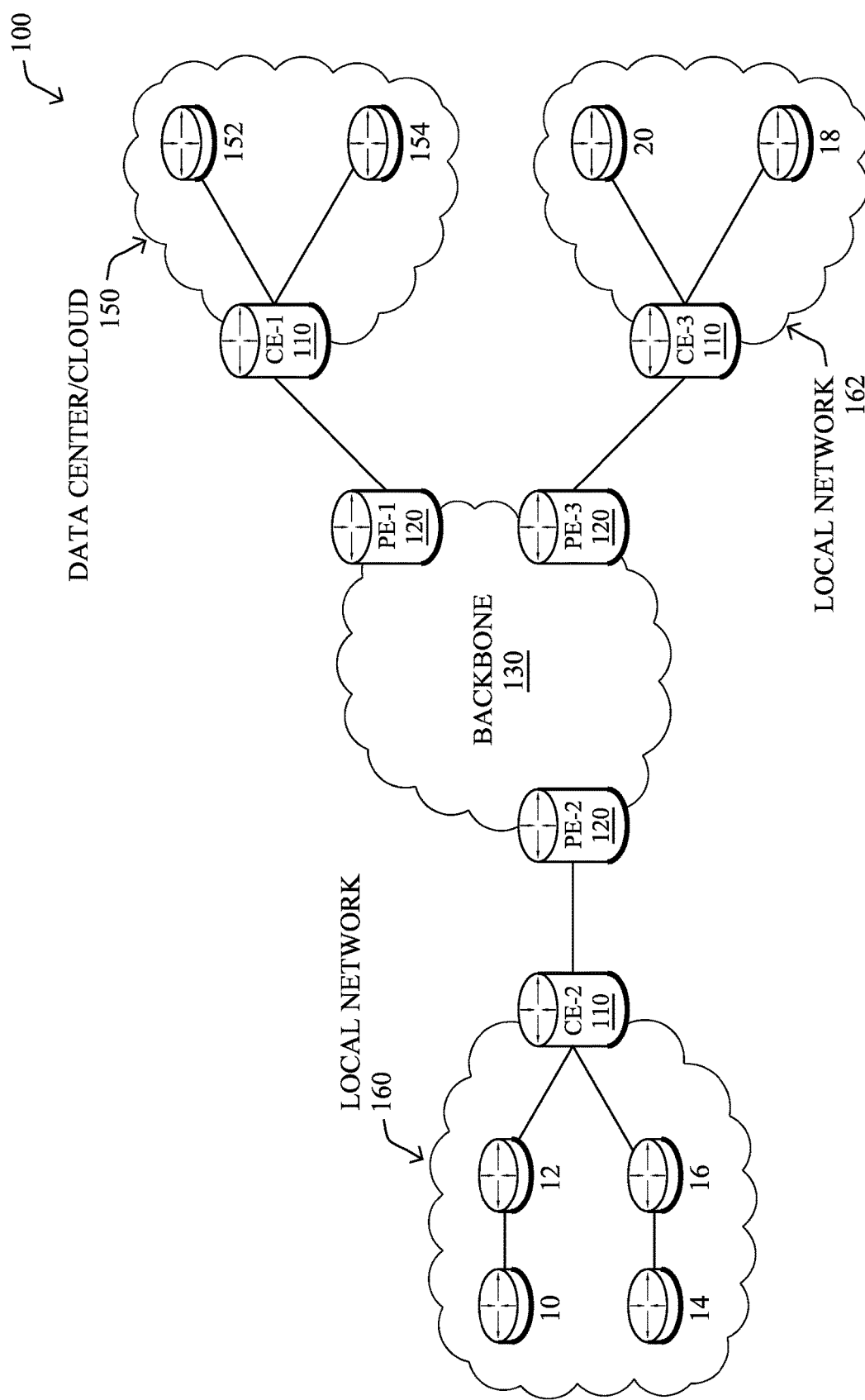

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
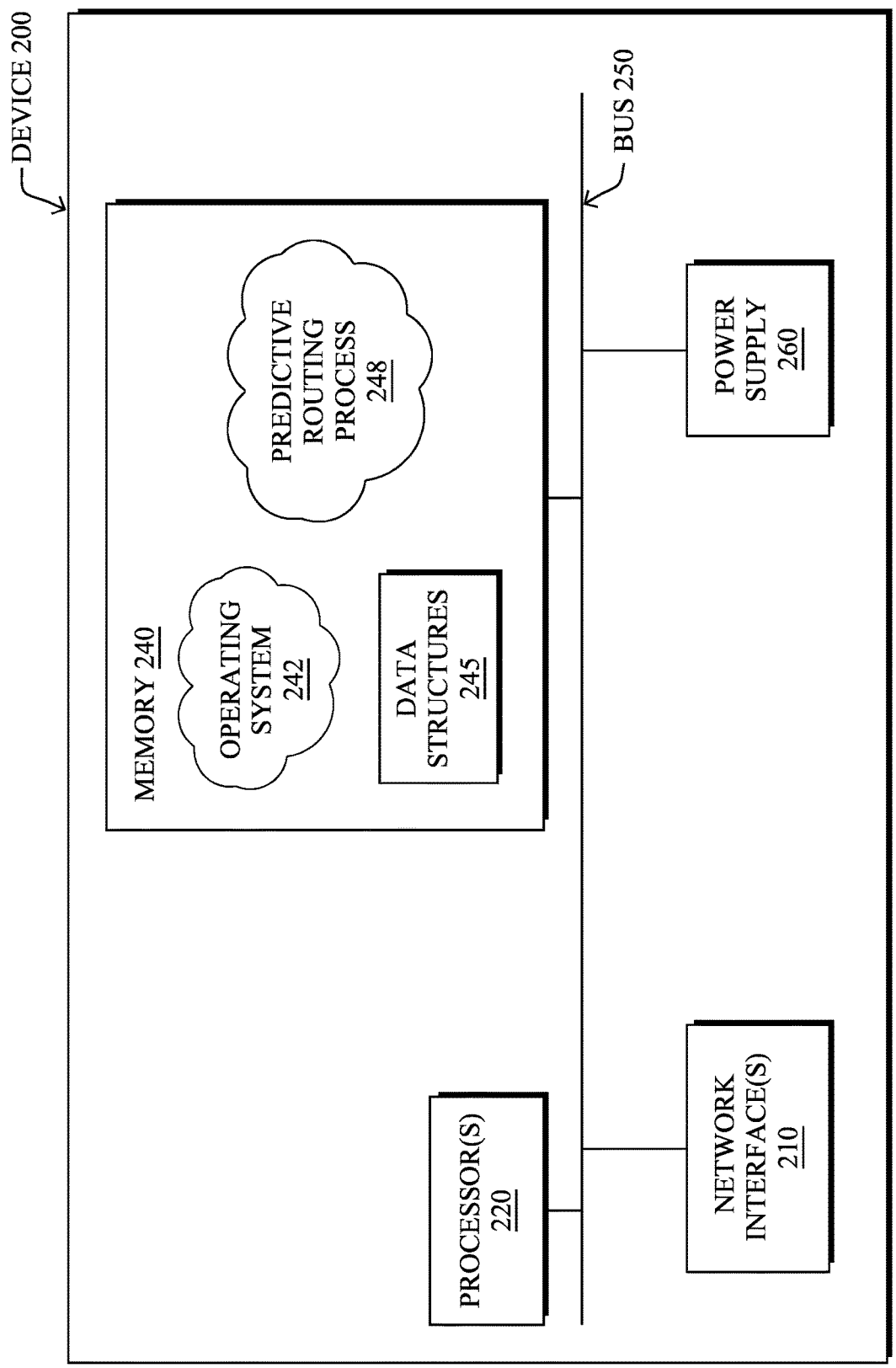
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a probing process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may include computer executable instructions that, when executed by processor(s) 220, cause device 200 to perform the techniques described herein. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
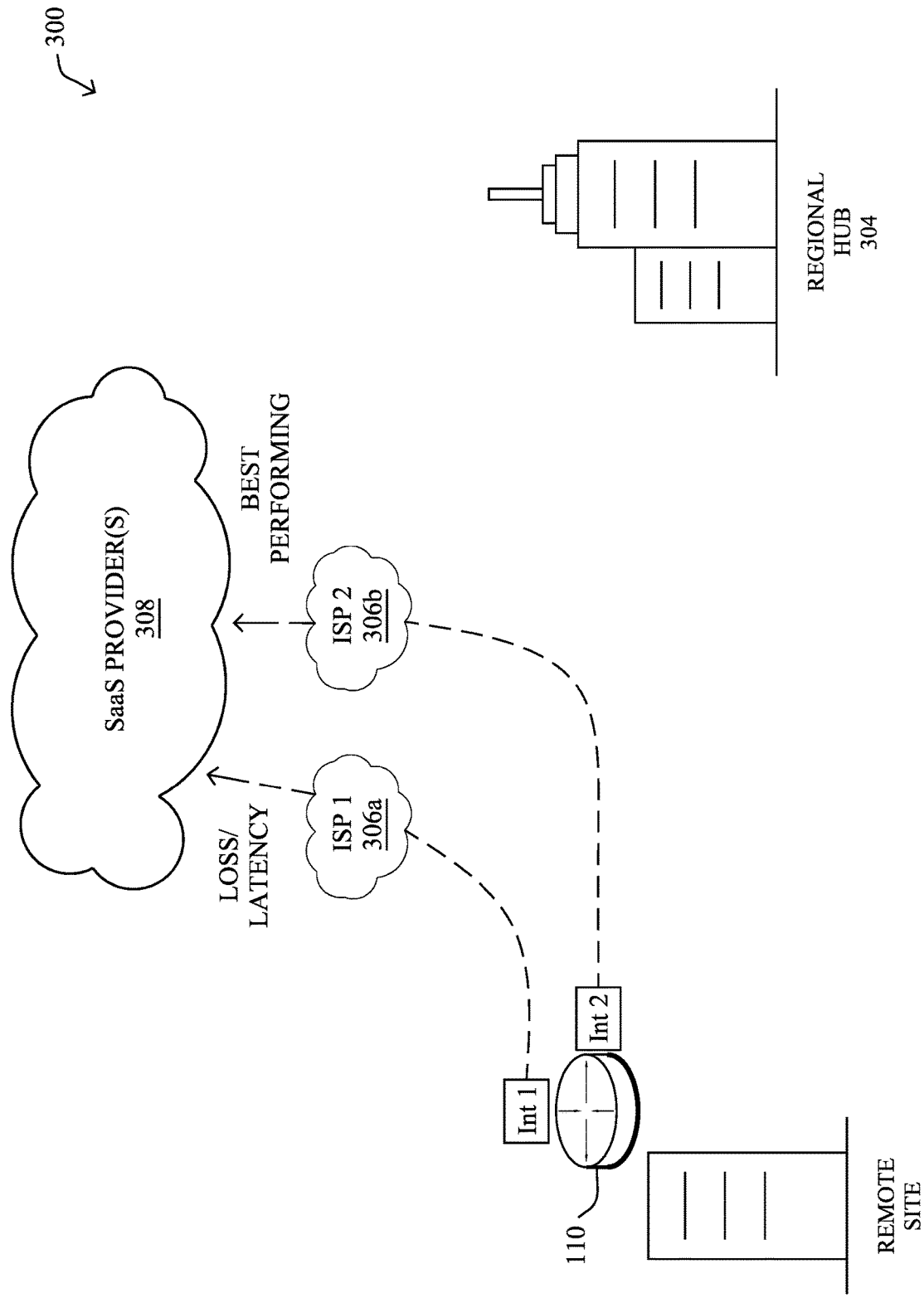
FIGS. 3A-3B illustrate example network deployments.
Figure 3B:
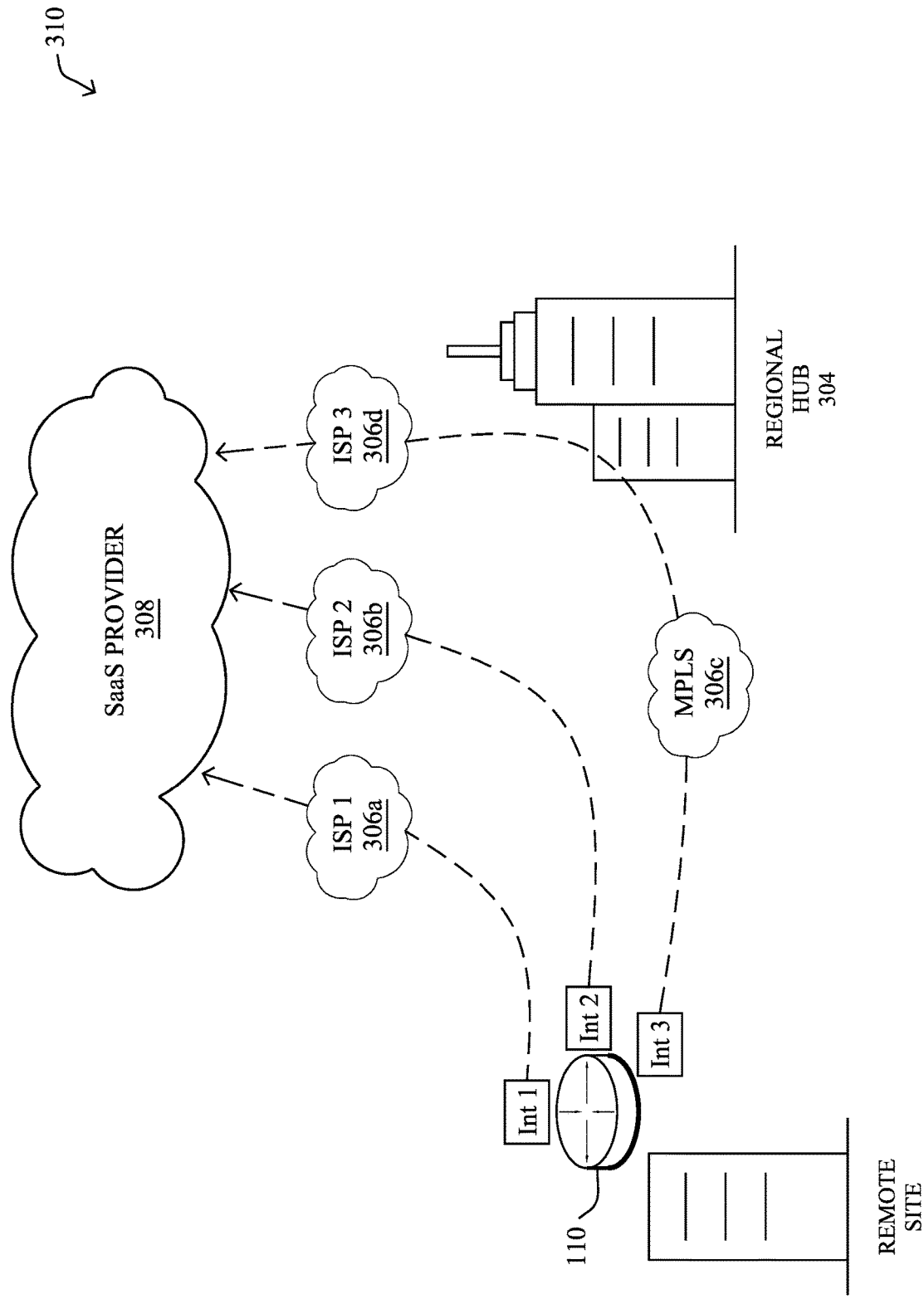

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
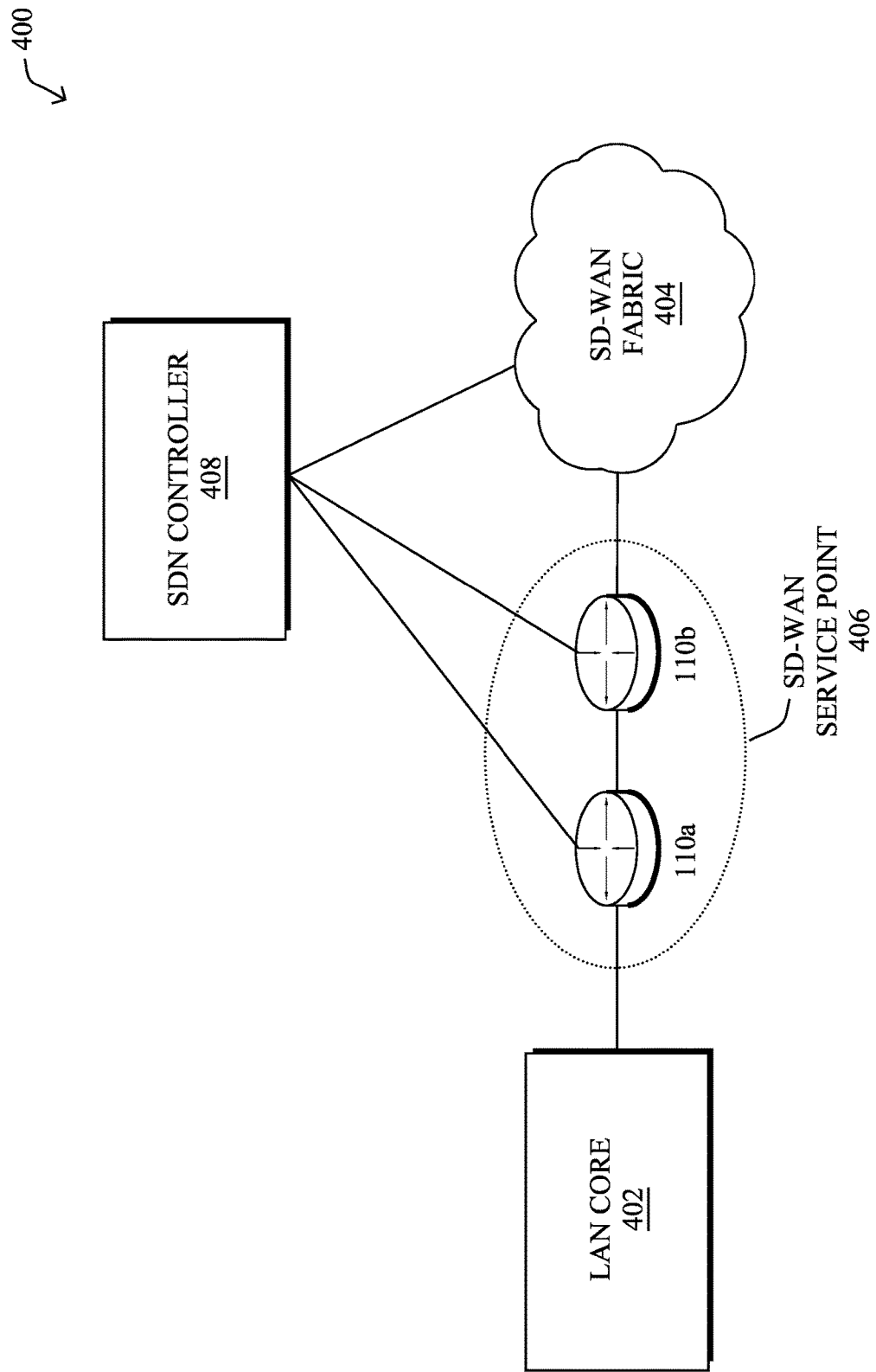
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network :leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
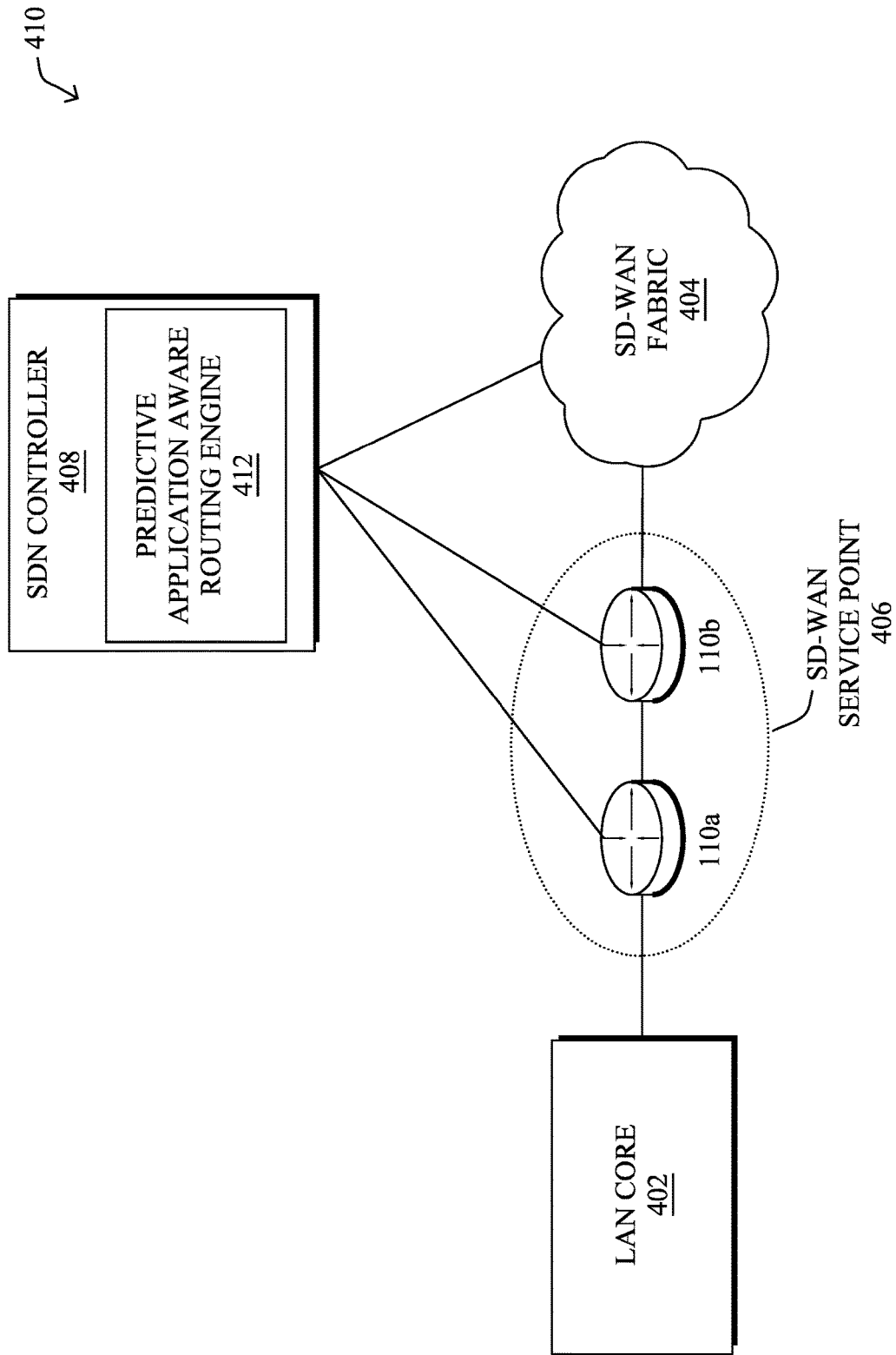

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, issues can arise for SaaS and other online applications at various places: the device of the user, the local LAN, the service provider(s) (SPs), the SaaS data center (DC), somewhere between the source SP and the DC, etc. In some cases, issues can also arise between different SaaS DCs. For instance, consider a video conference in which different users connect to different DCs, DC1 and DC2. In such a case, the DC1-DC2 connection itself may be the cause of the degraded user experience.

Simple probing (e.g., traceroute) can be used to assess network performance, such as by identifying hops that introduce the most latency. However, in practice, probing results may not be reflective of the true user experience of an online application. Thus, an application-aware routing engine, such as predictive application aware routing engine 412, may also ingest user experience metrics for the application, in order to select paths that avoid disruptions to the QoE of the application. However, user experience is more of a global metric that reflects how all of the various factors contribute to whether the user experience is acceptable. As such, it is not easy to attribute disruptions or poor user experience to specific parts, such as the SP, the DC, or SP-DC/DC-DC connections, When using simple probes (e.g., traceroute) to assess network performance, it is possible to identify hops that introduce the most latency. However, in practice, those probes might not be reflective of the true user experience. Application-aware routing engines, such as Alto, collect the user-experience from the applications in order to select paths that avoid actual user-experience disruptions. User experience is a more global metric that reflects how all factors contribute to make a service usable or not, and as such it is not easy to attribute disruptions or poor user experience to specific parts such as the SP, the DC, or SP-DC/DC-DC connections.

Root-Causing User Experience Anomalies to Coordinate Reactive Policies in Application-Aware Routing The techniques herein examine the routes from users to data centers of an online application, to detect anomalies at different entities along the path, such as at the egress SP, a particular DC, or combinations of SPs and/or DCs. In some aspects, the techniques herein may also be used to determine the root cause of the anomaly. In further aspects, the techniques herein can also be used to predict what might happen after an anomaly is detected. Such a prediction can be used to mitigate against possible drops in user experience metrics that may result in the future at other entities.

Illustratively, the techniques described herein may be performed by hardware, software, and/or firmware, such as in accordance with predictive routing process 248, which may include computer executable instructions executed by the processor 220 (or independent processor of interfaces 210) to perform functions relating to the techniques described herein.

Specifically, according to various embodiments, a device obtains user experience metrics for a plurality of sessions with an online application. The device detects a plurality of anomalies from among the user experience metrics. The device determines, based on a correlation between the plurality of anomalies, that a particular path entity is a root cause of the plurality of anomalies. The particular path entity comprises an egress service provider or data center of the online application. The device provides an indication of the particular path entity being the root cause of the plurality of anomalies.

Figure 5:
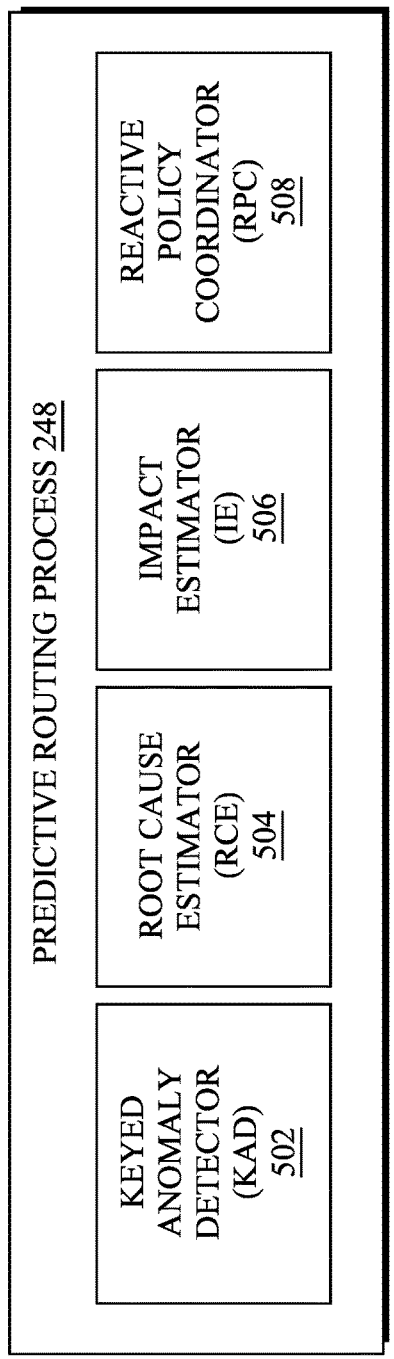
FIG. 5 illustrates an example architecture for root-causing user experience anomalies for an application.

Operationally, FIG. 5 illustrates an example architecture 500 for root-causing user experience anomalies for an application, according to various embodiments. At the core of architecture 500 is predictive routing process 248, which may be executed by a controller for a network or another device in communication therewith. For instance, probing process 249 may be executed by a controller for a network (e.g., SDN controller 408 in FIGS. 4A-4B), a particular networking device in the network (e.g., a router, etc.), another device or service in communication therewith, or the like, to provide a supervisory service to the network. More specifically, predictive routing process 248 may operate in conjunction with a predictive application aware routing engine, such as predictive application aware routing engine 412, or directed implemented as a component thereof, in some embodiments.

As shown, predictive routing process 248 may include any or all of the following components: a keyed anomaly detector (KAD) 502, a root cause estimator (RCE) 504, an impact estimator (IE) 506, and/or a reactive policy coordinator (RPC) 508. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248. In further embodiments, these components may be implemented separate from that of a predictive routing engine and operate in conjunction with other networking entities, as desired.

In various embodiments, predictive routing process 248 may rely on user experience data for the various SaaS sessions in the network. For instance, for a given session, user experience records can consist in regular messages of the form:

pathId: <identifier for the path between the client and the SaaS application>
sessionId: <identifier of the session—e.g., identifier of the call and user for voice calls>
window: <time interval to which the user experience metrics correspond>
metrics:
  Score1: 10.1 # Sample user experience metric
  ...

The user experience metrics may also include both the results of regular network probes (e.g., QoS probe results regarding loss, latency, or jitter), and user experience probes. A path is a description of the main hops used when going from the client to the SaaS application. For instance, a path may be described using the following form: Source edge device (where the client is).

Gateway device (optional, when backhauling through a gateway for the SaaS application's traffic).

Egress Service Provider (either at the source edge device, or at the gateway). In practice, a service provider can correspond to a service provider vendor as well as to some geographical location (e.g., Orange in Paris). The geographical location's granularity can be adapted based on the amount of data available.

SaaS Data. Center.

During execution, keyed anomaly detector (KAD) 502 is responsible for detecting anomalies in user experience along different path entities such as edge device, egress service provider, or SaaS data center. In one embodiment, KAD 502 may define the possible anomaly sources, which are called 'keys' or 'path entities' herein. The keys can be extracted from the path identifiers. For instance, the following keys/path entities can be used:

K1: The path's egress Service Provider (SP)
K2: The path's SaaS Data Center (DC)
K3: A combination of a path's (Egress SP, SaaS DC) as a composite key which will detect anomalies which occur to users connected to the given egress SP and a particular DC In some embodiments, KAD 502 may build an anomaly detection model for each observed value of the key. For instance, we might build models for the following combinations of entities:

TABLE 1

| Key | Value |
|---|---|
| Egress SP | Orange in Paris |
| Egress SP | CenturyLink, Paris |
| DC | Webex DC in London, UK |
| DC | Webex DC in Amsterdam, NL |
| (Egress SP, DC) | (Orange in Paris, Webex DC in London) |
| (Egress SP, DC) | (Orange in Paris, Webex DC in Amsterdam) |
| (Egress SP, DC) | (CenturyLink in Paris, Webex DC in London) |
| (Egress SP, DC) | (CenturyLink in Paris, Webex DC in Amsterdam) |

The anomaly detection model is estimated based on past user experience record metrics for paths that have the corresponding key value. In various implementations, KAD 502 may apply any of a variety of anomaly detection models such as density estimation, quantile regression, etc. For many key values, there may be limited samples if there have not been many corresponding sessions. In such cases, KAD 502. may also to drop any models in order to only retain models trained on sufficient data. This can be enforced with a minimum absolute number of samples, as well as with a train/test split for validation when there are enough samples.

Figure 6:
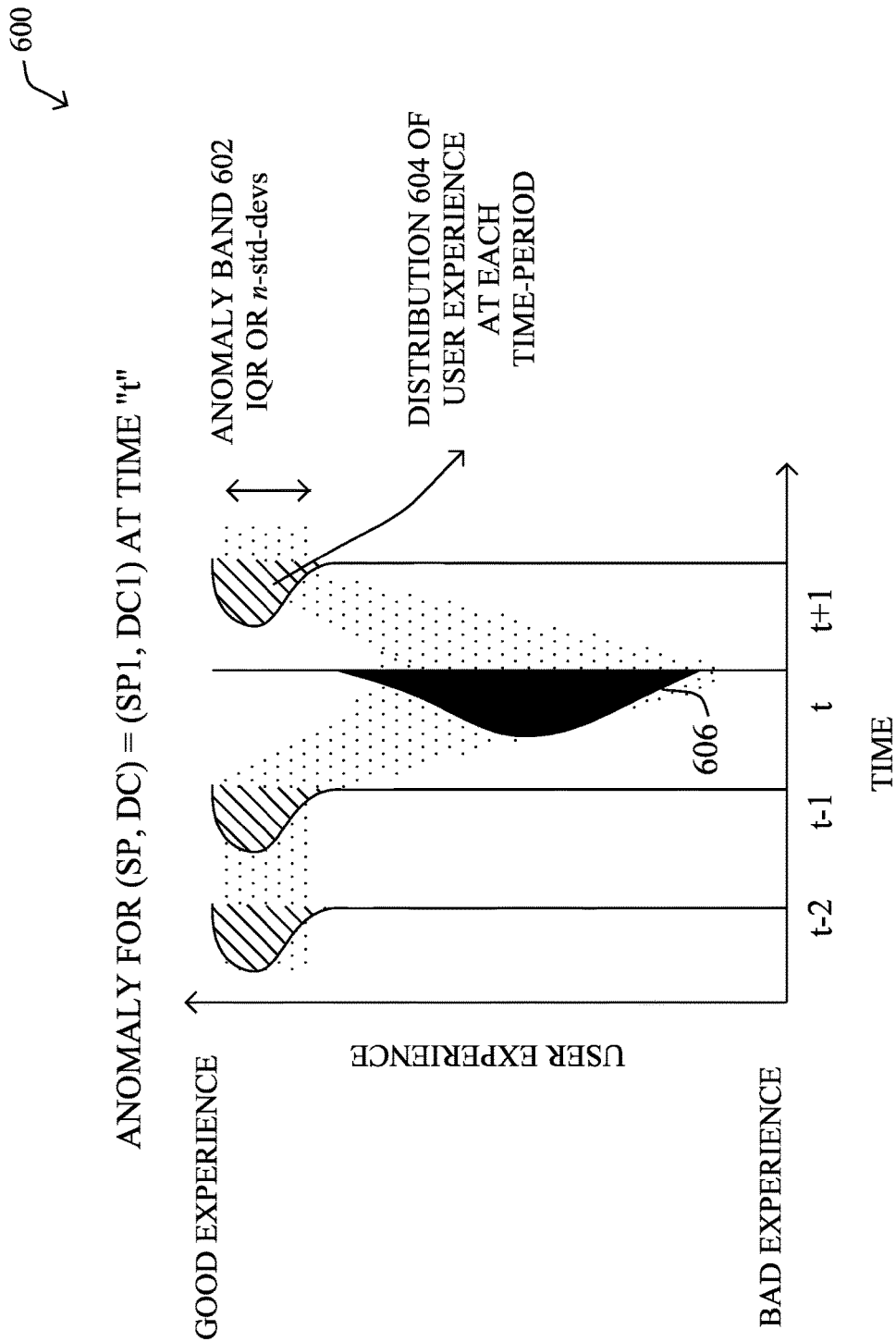
FIG. 6 illustrates an example plot showing a user experience anomaly.

In addition to identifying the anomalies, KAD 502 may also determine the appropriate anomaly detection band used to detect anomalies. Such a band may define what is considered normal versus abnormal. For example, FIG. 6 illustrates an example plot 600 showing a user experience anomaly, according to various embodiments. More specifically, at each time interval, KAD 502 may compute the distribution of user experience scores. For instance, KAD 502 may compute the distribution 606 of user experience scores at time t, the distribution 604 of user experience scores at time t+1, etc. From these, KAD 502 may compute the anomaly band as a measure of spread, such as the inter-quartile range (IQR) or n-number of standard deviations around the mean. Here, since the user experience exhibits a sudden drop at time t, distribution 606 may be flagged as anomalous.

Referring again to FIG. 5, in other embodiments, KAD 502 may update the anomaly detection models online or re-estimated, periodically. Anomaly detection models can also be adjusted by KAD 502 using a value function, which down-weights anomalies that are not of high impact (e.g., when the user experience is better than expected).

As new sets of user experience records are obtained, they may be used as input to the machine learning models of KAD 502, to produce scored anomalies. Note that such models will learn the baseline experience for a given key value. As such, a SP or a DC that always delivers poor user experience will not lead to anomalies and only changes with respect to the baseline will. In general, the techniques herein focus on dynamic changes as opposed to static findings about the performance of a given pail.

Another potential component of predictive routing process 248 is root cause estimator (RCE) 504, which is responsible for correlating anomalies and assigning potential causes to user experience records with poor experience. RCE 504 associates to each user experience anomalies that correspond to the path identifier and window. Multiple anomalies can be associated to a single record: for instance, anomalies for the SP, DC, SP-DC aggregations keys can be associated to a single record.

Figure 7A:
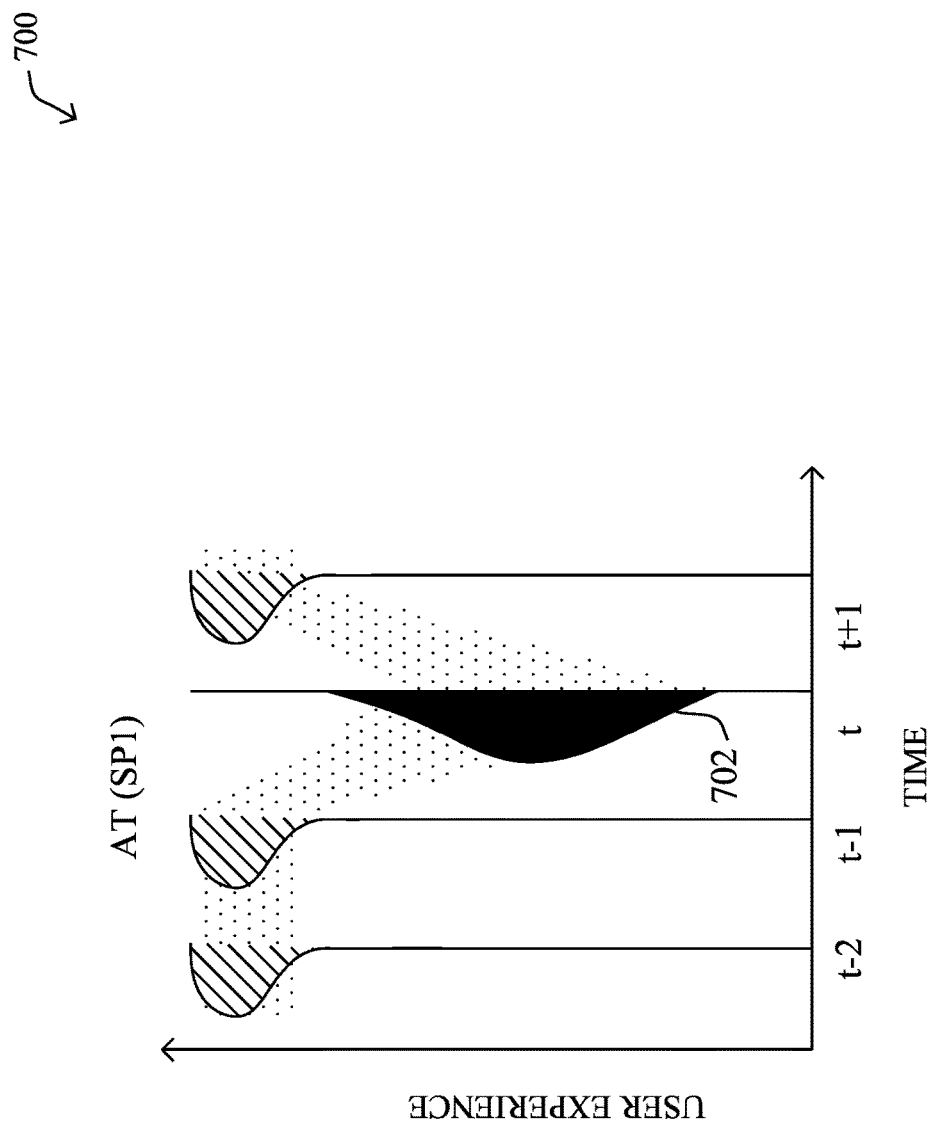
Figure 7B:
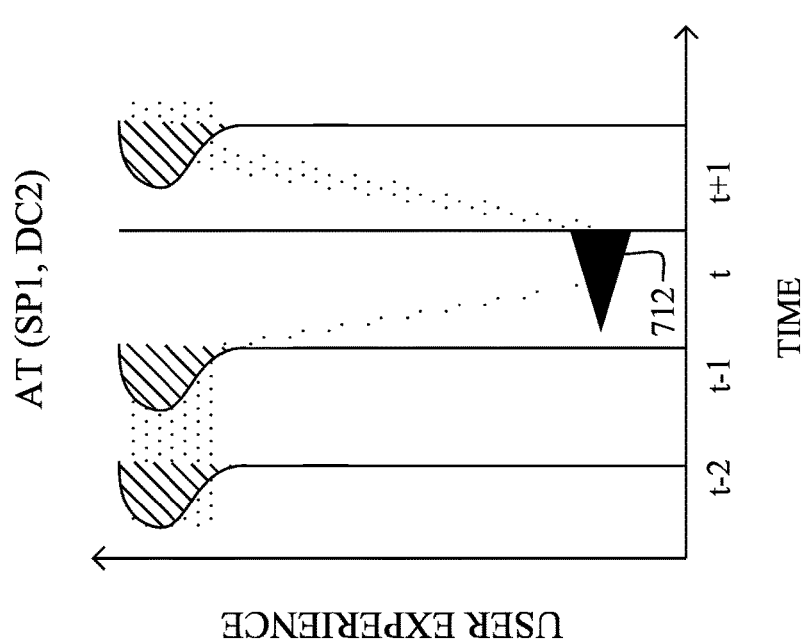
Figure 7D:
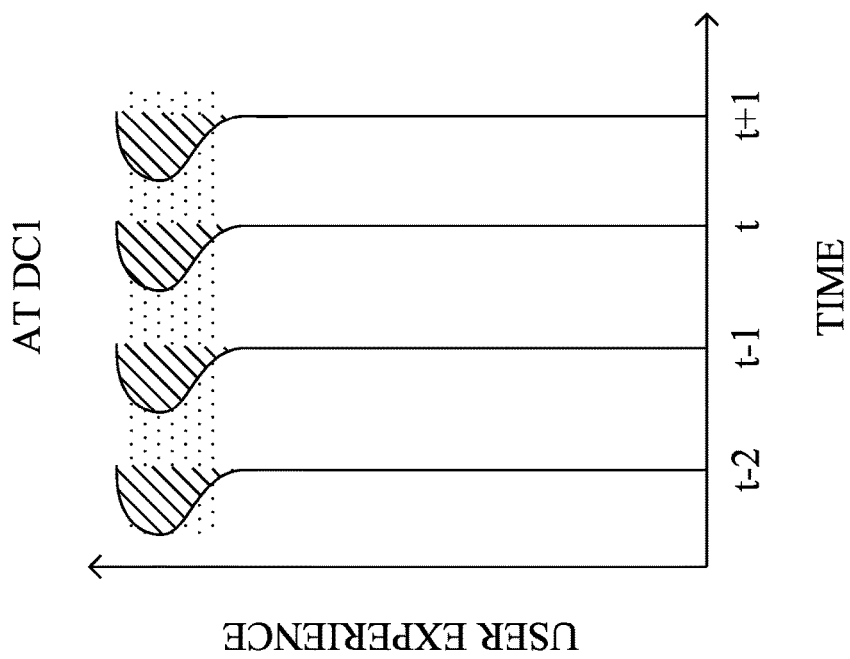

For example, consider FIGS. 7A-7D, which illustrate example plots of user experience metrics over time. More specifically, plot 700 in FIG. 7A shows a detected anomaly 702 at time t for the user experience metrics associated with a first service provider, SP1. Likewise, plot 710 in FIG. 7B shows that there is also an anomaly 712 at time t for the user experience metrics associated with the (SP1, DC1) key. However, plot 720 in FIG. 7C indicates that there was no corresponding anomaly at time t for the (SP1, DC2) key. Similarly, plot 730 in FIG. 7D shows that there was no corresponding anomaly at time t for the DC1 key.

Referring again to FIG. 5, in the scenario presented in FIGS. 7A-7D, RCE 504 may look at the anomaly score and the anomaly band (or distributions) to find the probable cause of the drop in user experience scores. Indeed, it is evident that all users who were connected to (SP1, DC1) had much higher chances of having a bad application experience (and lower width of the band) than the users who were just connected to SP1, irrespective of the DC. Hence, RCE 504 may assign the key value (SP1, DC1) as the probable cause for the anomaly. For each user-session that traversed the path having the (SP1, DC1) path entity, this would present a clear reason as to why their user experience was degraded.

In another embodiment, predictive routing process 248 may include impact estimator (IE) 506, which is responsible for identifying the impact of disruptions at a given SP, SaaS DC, or combination of those. IE 506 produces an impact message which can be used to drive long-term improvements of the various parts of the system, as well as to provide live visibility during disruptions about what the impact is.

Figure 8:
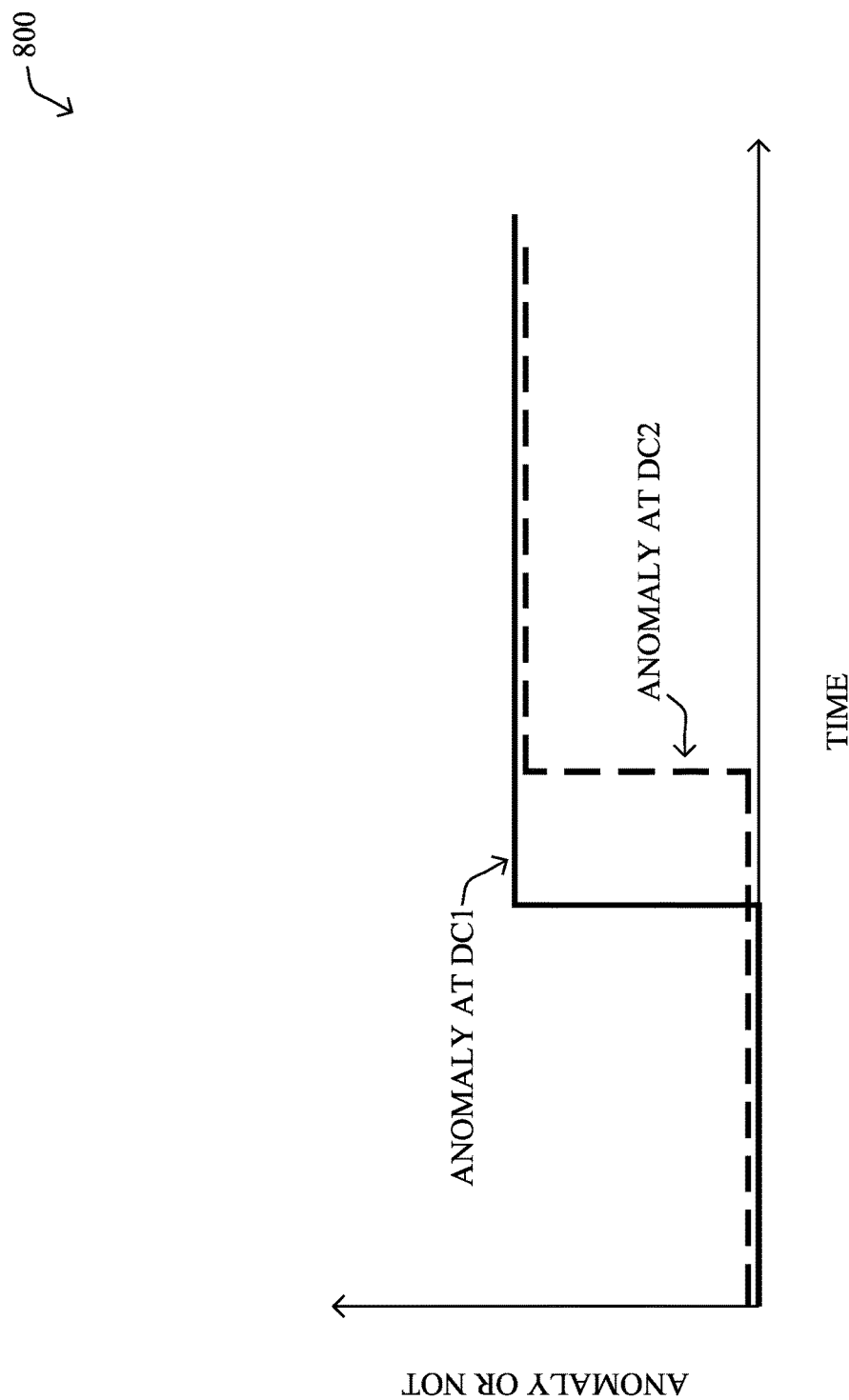
FIG. 8 illustrates an example plot of anomalies over time for different data centers.

For instance, plot 800 in FIG. 8 shows anomalies over time for different data centers. As shown, an anomaly may first occur at DC1 and then, say an hour later, an anomaly at DC2 may be detected. Note that this might be possible because of a persistent problem DC1 has shifted users from DC1 to the next nearest data-center DC2. If this pattern occurs commonly, then the system can predict that the anomaly at DC2 would occur next and send a message to the SaaS provider, the predictive routing engine, or other component of the network for corrective measures.

Referring yet again to FIG. 5, IE 506 may monitor the anomalies and also the number of user-sessions connected to each key-value that is seen. IE 506 can then correlate the anomalies at key-value with anomalies with other key-value or number of user-sessions with time-lag. IE 506 may also use an approach such as Time-lagged Cross Correlation (TLCC), to detect such correlations. In other embodiments, every time-series maintained by IE 506 can be forecasted as a function of every other time-series. At every time-step, if the forecaster predicts anomaly or high number of user sessions, and it is determined due to anomaly that has previous occurred on other key-value, IE 506 will send a message indicating such a possibility.

In various embodiments, reactive policy coordinator (RPC) 508 may be configured to produce reactive policies (e.g., policy changes that should be applied right away to mitigate a disruption) to apply at any or all of the following:

For anomalies that include an edge router, a reactive routing policy can be pushed via SD-WAN to use an alternate path. A predictive routing engine can also be used to pick the best path based on 'what-if scenarios' (e.g., estimations of whether an alternate path will be able to cope with additional traffic).

For anomalies that include a SaaS DC for a SaaS application that has a partnership with the routing system, DC selection hints can be pushed for the corresponding paths or users to the SaaS provider. These DC selection hints can apply for the next session initiations in the corresponding scope. The SaaS provider can also change its Domain Name System (DNS) policy to not route (or route only a small fraction) of the DNS requests to the affected SaaS data center.

Secure Access Service Edge (SASE) components can also be notified in a similar manner as to the DC selection hints.

In yet another embodiment, RPC 508 may communicate with a user interface, to gather feedback about the probable root cause from a network administrator, so as to validate the correlation and learn the relationship for further evaluation.

When multiple choices of alternative path and reactive policy exist, RPC 508 can also rely on the impact reports and messages from IE 506. The SaaS provider and/or routing engine can subscribe to such messages. Once a message of probable anomaly on a key-value is predicted the routing engine can change the paths to avoid the particular key, where possible. For example, if the routing engine gets a message saying that there is a possible low user-experience predicted in the next hour on all connections going on SP1, it can reroute the traffic on a different interface where the egress SP is not SP1. Similarly, the SaaS provider can redirect the loads to other data-center if it receives a message saying DC1 may experience low user-experience anomalies in the next few hours.

Figure 9:
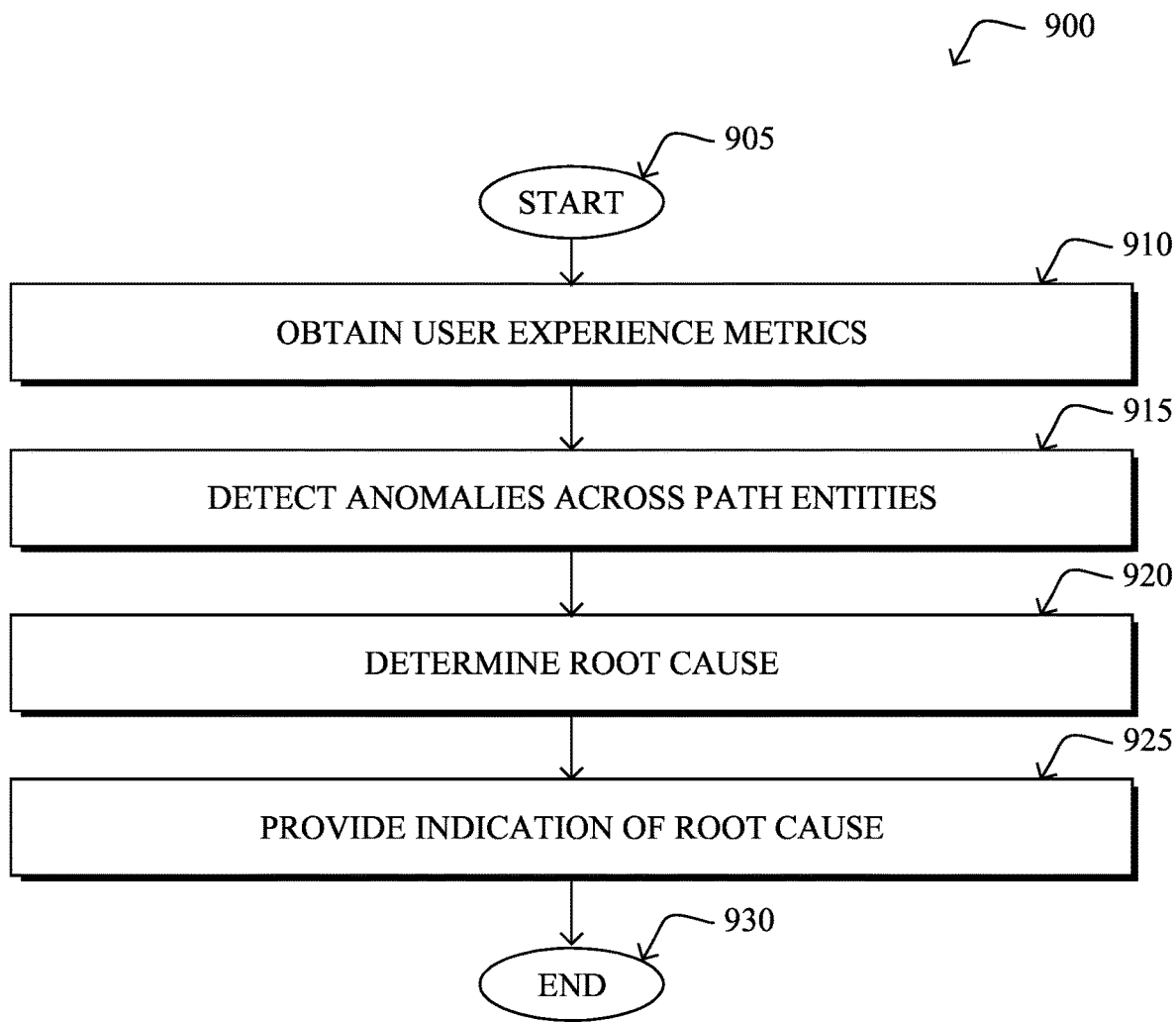
FIG. 9 illustrates an example simplified procedure for determining the root cause of user experience anomalies for an application.

FIG. 9 illustrates an example simplified procedure 900 (e.g., a method) procedure for determining the root cause of user experience anomalies for an application, in accordance with one or more embodiments described herein. For example, a non-generic, specifically configured device (e.g., device 200), such as controller for a network (e.g., an SDN controller or other device in communication therewith), may perform procedure 900 by executing stored instructions (e.g., probing process 249), to provide a supervisory service to a network. The procedure 900 may start at step 905, and continues to step 910, where, as described in greater detail above, the device may obtain user experience metrics for a plurality of sessions with an online application, such as a SaaS application. In various embodiments, the user experience metrics may be specified by users of the online application, such as via a survey or rating mechanisms integrated into the application, or through a similar mechanism that works outside of the application. In further embodiments, the device may obtain the user experience metrics from the online application.

At step 915, as detailed above, the device may detect a plurality of user experience metrics from among the user experience metrics. In various embodiments, the device may do so by associating the user experience metrics with path entities for their respective sessions. Such path entities may comprise service providers, data centers of the online application, and/or connections between them. In turn, the device may use the user experience metrics and their associated path entities as input to an anomaly detection model.

At step 920, the device may determine, based on a correlation between the plurality of detected anomalies, that a particular path entity is the root cause of the plurality of anomalies, as described in greater detail above. In various embodiments, the device may do so by correlating anomalies across different combinations of path entities. For instance, the device may assess whether anomalies were detected within a certain timeframe at different service providers, data centers, and links therebetween, to identify the root cause.

At step 925, as detailed above, the device may provide an indication of the particular path entity being the root cause of the plurality of anomalies. In various embodiments, the device may provide the indication to an application-aware It should be noted that while certain steps within procedure 900 may be optional as described above, the steps shown in FIG. 9 are merely examples for illustration, and to certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide system and methods to detect user experience anomalies in an application-driven routing system, as well as to determine the root causes of them. In general, root cause information can be used to quantify what the impact of certain types of events can be, to drive manual capacity or policy changes. In addition, root cause information can be used at short time scales when an anomaly is detected to try and apply reactive routing policies. Using the identified root cause, a predictive application-aware routing engine can also integrate with SD-WAN and SASE providers, or even SaaS providers, to apply policy changes at the right location so as to avoid disruptions.

For instance, when a root cause is identified to be primarily in a SaaS DC, the system can avoid unnecessary or potentially harmful routing policy changes at the edge if it can be established that these are unlikely to help. Similarly, when a root cause is identified to be due to a combination of parts (e.g., the combination of an edge path and of a given SaaS DC), coordinated policy changes could be applied to respective components to try and resolve the problem. Further aspects of the techniques herein also introduce an impact prediction mechanism that is responsible to predict the effects of an anomaly occurring at any a given entity (e.g., at a particular SaaS DC), and raise alerts, accordingly. Finally, the techniques herein also introduce reactive policy enforcement mechanisms that listen to the root-causing agent and impact predictor, and acts to alter the SaaS paths such that user experience is not compromised.

While there have been shown and described illustrative embodiments that provide for the root causing of user experience anomalies, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
obtaining, by a device, user experience metrics for a plurality of sessions with an online application;
detecting, by the device, a plurality of anomalies from among the user experience metrics;
determining, by the device and based on a correlation between the plurality of anomalies, that a particular path entity among a plurality of path entities is a root cause of the plurality of anomalies by correlating anomalies across different combinations of the plurality of path entities, wherein the particular path entity comprises an egress service provider or data center of the online application; and
providing, by the device, an indication of the particular path entity being the root cause of the plurality of anomalies.

2. The method as in claim 1, wherein the device obtains the user experience metrics from the online application.

3. The method as in claim 1, wherein the user experience metrics are specified by users of the online application.

4. The method as in claim 1, wherein detecting the plurality of anomalies comprises:
associating the user experience metrics with path entities for their respective sessions; and
using the user experience metrics and their associated path entities as input to an anomaly detection model.

5. The method as in claim 1, wherein the particular path entity is a connection between two data centers of the online application.

6. The method as in claim 1, wherein the particular path entity is a connection between a service provider and a data center of the online application.

7. The method as in claim 1, wherein the indication causes sessions with the online application to avoid the particular path entity.

8. The method as in claim 1, wherein the device provides the indication to an application-aware routing engine.

9. The method as in claim 1, wherein the device provides the indication to a provider of the online application.

10. An apparatus, comprising:
one or more network interfaces;
a processor coupled to the one or more network interfaces and configured to execute one or more processes; and
a memory configured to store a process that is executable by the processor, the process when executed configured to:
  obtain user experience metrics for a plurality of sessions with an online application;
  detect a plurality of anomalies from among the user experience metrics;
  determine, based on a correlation between the plurality of anomalies, that a particular path entity among a plurality of path entities is a root cause of the plurality of anomalies by correlating anomalies across different combinations of the plurality of path entities, wherein the particular path entity comprises an egress service provider or data center of the online application; and
  provide an indication of the particular path entity being the root cause of the plurality of anomalies.

11. The apparatus as in claim 10, wherein the apparatus obtains the user experience metrics from the online application.

12. The apparatus as in claim 10, wherein the user experience metrics are specified by users of the online application.

13. The apparatus as in claim 10, wherein the apparatus detects the plurality of anomalies by:
  associating the user experience metrics with path entities for their respective sessions; and
  using the user experience metrics and their associated path entities as input to an anomaly detection model.

14. The apparatus as in claim 10, wherein the particular path entity is a connection between two data centers of the online application.

15. The apparatus as in claim 10, wherein the particular path entity is a connection between a service provider and a data center of the online application.

16. The apparatus as in claim 10, wherein the indication causes sessions with the online application to avoid the particular path entity.

17. The apparatus as in claim 10, wherein the apparatus provides the indication to an application-aware routing engine or to a provider of the online application.

18. A tangible, non-transitory, computer-readable medium storing program instructions that cause a device to execute a process comprising:
  obtaining, by the device, user experience metrics for a plurality of sessions with an online application;
  detecting, by the device, a plurality of anomalies from among the user experience metrics;
  determining, by the device and based on a correlation between the plurality of anomalies, that a particular path entity among a plurality of path entities is a root cause of the plurality of anomalies by correlating anomalies across different combinations of the plurality of path entities, wherein the particular path entity comprises an egress service provider or data center of the online application; and
  providing, by the device, an indication of the particular path entity being the root cause of the plurality of anomalies.

* * * * *

UNITED STATES PATENT AND TRADEMARK OFFICE
CERTIFICATE OF CORRECTION

PATENT NO. : 11,706,130 B2
APPLICATION NO. : 17/379252
DATED : July 18, 2023
INVENTOR(S) : Vinay Kumar Kolar et al.

It is certified that error appears in the above-identified patent and that said Letters Patent is hereby corrected as shown below:

In the Specification

Column 1, Line 30, please amend as shown:
(SLAs). For instance, latency that exceeds a defined SLA Column 8, Line 65, please amend as shown:
of a new server deployed in the network leading to a Column 10, Line 38, please amend as shown:
SP-DC/DC-DC connections.

Column 12, Line 9, please amend as shown:
SaaS Data Center.

Column 12, Line 48, please amend as shown:
502 may also drop any models in order to only retain Column 13, Line 15, please amend as shown:
about the performance of a given part.

Column 13, Line 39, please amend as shown:
cause of the drop in user experience scores. Indeed, it is Column 13, Line 60, please amend as shown:
because of a persistent problem in DC1 has shifted users from Column 15, Line 30, please amend as shown:
shown in FIG. 9 are merely examples for illustration, and Signed and Sealed this
Twenty-fourth Day of October, 2023

Katherine Kelly Vidal
*Director of the United States Patent and Trademark Office*